United States Patent
Graffagnino et al.

(10) Patent No.: US 10,172,078 B2
(45) Date of Patent: Jan. 1, 2019

(54) TARGETED USER EQUIPMENT-BASE STATION COMMUNICATION LINK

(71) Applicant: Oceus Networks Inc., Reston, VA (US)

(72) Inventors: Vincent Charles Graffagnino, Rockwall, TX (US); Kevin Dean Stiles, Allen, TX (US)

(73) Assignee: Oceus Networks Inc., Reston, VA (US)

( * ) Notice: Subject to any disclaimer, the term of this patent is extended or adjusted under 35 U.S.C. 154(b) by 0 days.

(21) Appl. No.: 15/942,208

(22) Filed: Mar. 30, 2018

(65) Prior Publication Data
US 2018/0288687 A1  Oct. 4, 2018

Related U.S. Application Data

(60) Provisional application No. 62/479,877, filed on Mar. 31, 2017.

(51) Int. Cl.
  *H04W 48/16* (2009.01)
  *H04W 48/20* (2009.01)
  *H04W 48/10* (2009.01)

(52) U.S. Cl.
  CPC .......... *H04W 48/16* (2013.01); *H04W 48/10* (2013.01); *H04W 48/20* (2013.01)

(58) Field of Classification Search
  CPC .............. H04W 52/146; H04W 52/30; H04W 74/0833; H04W 52/18; H04W 72/02;
(Continued)

(56) References Cited

U.S. PATENT DOCUMENTS 5,309,503 A * 5/1994 Bruckert ............ H04W 72/085
                                                455/436
5,768,501 A   6/1998 Lewis
(Continued)

FOREIGN PATENT DOCUMENTS

EP     1401229 A1    3/2004
EP     1553734 A1    7/2005
(Continued)

OTHER PUBLICATIONS

"Digital cellular telecommunications system (Phase 2+); Universal Mobile Telecommunications System (UMTS); LTE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.

(Continued)

*Primary Examiner* — Nizar Sivji
(74) *Attorney, Agent, or Firm* — Knobbe, Martens, Olson & Bear, LLP

(57) ABSTRACT

A mobile device can receive information blocks from one or more base stations, which can be emitted by the base stations within a particular radio band. The mobile device can identify base stations in an exclusivity state. The mobile device can establish a communication link with one of the base stations in the exclusivity state. In some cases, the mobile device can establish a communication link with the base stations that is in an exclusivity state and that matches a cell identifier stored on the mobile device.

16 Claims, 7 Drawing Sheets

(58) Field of Classification Search
CPC ............ H04W 72/1284; H04W 48/08; H04W 52/245; H04W 52/50; H04W 72/0406; H04W 76/10; H04W 28/06; H04W 72/0426; H04W 72/10; H04W 48/20; H04L 5/0007; H04L 5/0051; H04L 5/0094; H04M 15/66; H04M 15/8044; H04M 15/8351

See application file for complete search history.

(56) References Cited

U.S. PATENT DOCUMENTS

| | | | |
|---|---|---|---|
| 6,842,462 | B1 | 1/2005 | Ramjee et al. |
| 6,965,816 | B2 | 11/2005 | Walker |
| 7,486,967 | B2 | 2/2009 | Pan et al. |
| 7,535,861 | B2 | 5/2009 | Buchholz et al. |
| 7,539,158 | B2 | 5/2009 | Pan |
| 7,548,763 | B2 | 6/2009 | Pan |
| 7,567,822 | B2 | 7/2009 | Hart et al. |
| 7,573,713 | B2 | 8/2009 | Hoffman et al. |
| 7,653,414 | B2 | 1/2010 | Pan |
| 7,684,801 | B2 | 3/2010 | Suzuki et al. |
| 7,805,372 | B2 | 9/2010 | Weiss |
| 7,817,589 | B2 | 10/2010 | Hoffman et al. |
| 7,840,230 | B2 | 11/2010 | Pan |
| 7,855,988 | B2 | 12/2010 | Pan |
| 7,856,233 | B2 | 12/2010 | Pan |
| 7,979,066 | B2 | 7/2011 | Pan |
| 8,036,158 | B2 | 10/2011 | Pan et al. |
| 8,046,420 | B2 | 10/2011 | Pan |
| 8,089,920 | B2 | 1/2012 | Pan |
| 8,107,409 | B2 | 1/2012 | Pan |
| 8,140,077 | B2 | 3/2012 | Saifullah et al. |
| 8,224,322 | B2 | 7/2012 | Pan |
| 8,270,325 | B2 | 9/2012 | Hoffman et al. |
| 8,310,990 | B2 | 11/2012 | Pan |
| 8,326,286 | B2 | 12/2012 | Pan |
| 8,340,667 | B2 | 12/2012 | Pan |
| 8,359,029 | B2 | 1/2013 | Pan |
| 8,374,124 | B2 | 2/2013 | Abusch-Magder et al. |
| 8,503,336 | B2 | 8/2013 | Rappaport et al. |
| 8,626,210 | B2 | 1/2014 | Hicks, III |
| 8,654,749 | B2 | 2/2014 | Buchholz et al. |
| 8,676,197 | B2 | 3/2014 | Pan et al. |
| 8,688,111 | B2 | 4/2014 | Pan |
| 8,706,105 | B2 | 4/2014 | Pan |
| 8,744,435 | B2 | 6/2014 | Pan |
| 8,780,804 | B2 | 7/2014 | Pan |
| 8,811,992 | B2 | 8/2014 | Hoole |
| 8,824,969 | B2 | 9/2014 | Nakamori et al. |
| 9,055,163 | B1 | 6/2015 | Row, II et al. |
| 9,167,442 | B2 | 10/2015 | Uelk et al. |
| 9,198,221 | B2 | 11/2015 | Schemagin et al. |
| 9,226,192 | B2 | 12/2015 | Graffagnino et al. |
| 9,264,241 | B2 | 2/2016 | Balar et al. |
| 9,444,801 | B2 | 9/2016 | Luo et al. |
| 9,445,280 | B2 | 9/2016 | Uelk et al. |
| 9,451,646 | B2 | 9/2016 | Schemagin et al. |
| 9,686,238 | B1 | 6/2017 | Row, II |
| 9,742,729 | B2 | 8/2017 | Graffagnino et al. |
| 9,912,640 | B2 | 3/2018 | Row, II |
| 9,924,427 | B2* | 3/2018 | Graffagnino .......... H04W 36/08 |
| 2001/0013107 | A1 | 8/2001 | Lewis |
| 2004/0259555 | A1 | 12/2004 | Rappaport et al. |
| 2006/0015745 | A1 | 1/2006 | Sukigara et al. |
| 2006/0098661 | A1 | 5/2006 | Pan |
| 2006/0178153 | A1* | 8/2006 | Tenny ................... H04W 48/20 455/450 |
| 2006/0192651 | A1 | 8/2006 | Lee |
| 2006/0234747 | A1 | 10/2006 | Pan et al. |
| 2006/0234774 | A1 | 10/2006 | Pan et al. |
| 2007/0049267 | A1 | 3/2007 | Kota et al. |
| 2007/0202847 | A1 | 8/2007 | Pan et al. |
| 2007/0232267 | A1 | 10/2007 | Pan et al. |
| 2007/0253359 | A1 | 11/2007 | Hall et al. |
| 2007/0264930 | A1 | 11/2007 | Daoudal |
| 2007/0287452 | A1 | 12/2007 | Pan et al. |
| 2008/0005380 | A1 | 1/2008 | Kawasaki et al. |
| 2008/0039144 | A1 | 2/2008 | Pan et al. |
| 2008/0108378 | A1 | 5/2008 | Gessner et al. |
| 2008/0146158 | A1 | 6/2008 | Pan et al. |
| 2008/0181188 | A1 | 7/2008 | Aghvami et al. |
| 2008/0268830 | A1 | 10/2008 | Sharma et al. |
| 2008/0285492 | A1 | 11/2008 | Vesterinen |
| 2009/0201878 | A1 | 8/2009 | Kotecha et al. |
| 2009/0205023 | A1 | 8/2009 | Pan et al. |
| 2009/0227235 | A1 | 9/2009 | Pan et al. |
| 2009/0232019 | A1 | 9/2009 | Gupta et al. |
| 2009/0271491 | A1 | 10/2009 | Pan et al. |
| 2009/0280853 | A1 | 11/2009 | Brisebois et al. |
| 2009/0325584 | A1 | 12/2009 | Pan et al. |
| 2009/0327819 | A1 | 12/2009 | Pan et al. |
| 2010/0008306 | A1 | 1/2010 | Pan et al. |
| 2010/0008369 | A1 | 1/2010 | Pan |
| 2010/0027448 | A1 | 2/2010 | Puthiyandyil et al. |
| 2010/0075668 | A1 | 3/2010 | Pan et al. |
| 2010/0105373 | A1 | 4/2010 | Kanade |
| 2010/0190470 | A1 | 7/2010 | Raleigh |
| 2010/0197268 | A1 | 8/2010 | Raleigh |
| 2010/0202455 | A1 | 8/2010 | Sundaram et al. |
| 2010/0260157 | A1 | 10/2010 | Buchholz et al. |
| 2011/0059740 | A1 | 3/2011 | Pan et al. |
| 2011/0060853 | A1 | 3/2011 | Pan et al. |
| 2011/0122824 | A1 | 5/2011 | Muhanna et al. |
| 2011/0130135 | A1 | 6/2011 | Trigui |
| 2011/0176536 | A1 | 7/2011 | De Franca Lima et al. |
| 2011/0195743 | A1 | 8/2011 | Jee et al. |
| 2011/0202589 | A1 | 8/2011 | Piernot et al. |
| 2011/0223921 | A1 | 9/2011 | Pan et al. |
| 2011/0263253 | A1* | 10/2011 | Zhao ................... H04W 74/006 455/434 |
| 2011/0275364 | A1 | 11/2011 | Austin et al. |
| 2011/0300866 | A1* | 12/2011 | Ali ..................... H04W 36/0083 455/436 |
| 2012/0002607 | A1 | 1/2012 | Pan et al. |
| 2012/0051321 | A1 | 3/2012 | De et al. |
| 2012/0094659 | A1 | 4/2012 | Pan et al. |
| 2012/0106454 | A1 | 5/2012 | Pan et al. |
| 2012/0147874 | A1 | 6/2012 | Kotecha |
| 2012/0224474 | A1 | 9/2012 | Beser |
| 2012/0224566 | A1 | 9/2012 | O'Leary |
| 2012/0252444 | A1 | 10/2012 | Pan et al. |
| 2012/0269167 | A1 | 10/2012 | Velev et al. |
| 2012/0276866 | A1 | 11/2012 | Sennett et al. |
| 2013/0003697 | A1 | 1/2013 | Adjakple et al. |
| 2013/0028097 | A1 | 1/2013 | Barrett |
| 2013/0029708 | A1 | 1/2013 | Fox et al. |
| 2013/0039279 | A1 | 2/2013 | Pan et al. |
| 2013/0065583 | A1 | 3/2013 | Pan et al. |
| 2013/0130677 | A1 | 5/2013 | Pan et al. |
| 2013/0148578 | A1 | 6/2013 | Pan et al. |
| 2014/0154967 | A1 | 6/2014 | Pan et al. |
| 2014/0173388 | A1 | 6/2014 | Pan et al. |
| 2014/0315553 | A1 | 10/2014 | Hoole |
| 2015/0181492 | A1 | 6/2015 | Schmidt et al. |
| 2015/0319774 | A1 | 11/2015 | Cai et al. |
| 2015/0358959 | A1 | 12/2015 | Meshkati et al. |
| 2017/0238229 | A1 | 8/2017 | Schemagin et al. |
| 2018/0013724 | A1 | 1/2018 | Row, II |
| 2018/0014340 | A1 | 1/2018 | Hill et al. |
| 2018/0034771 | A1 | 2/2018 | Graffagnino et al. |

FOREIGN PATENT DOCUMENTS

| | | |
|---|---|---|
| EP | 2031920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031597 | 2/2014 |
| WO | WO 2014/031689 A1 | 2/2014 |
| WO | WO 2014/179235 | 11/2014 |

(56) References Cited

FOREIGN PATENT DOCUMENTS

OTHER PUBLICATIONS

Kaul, et al.: "On the adpatation of commercial smartphones to tactical environments", Military Communications Conference, 2011, Nov. 7, 2011, pp. 2205-2210.
Nystromer, "Quiclink: A Portable 3G WCDMA Cellular Service, Deployed in Minutes" Presentation, Jun. 11, 2007, pp. 1-27.
Press Release: Harris Corporation Introduces Tactical 3G Cellular Network-in-a-Box for Warfighters, Published Apr. 19, 2011, http://harris.com/view_ pressrelease.asp?pr_id=3230.
Press Release: Tecore Unveils the Mobile Industry's First 3G-4G Network in a Box (NIB), Published Feb. 14, 2011, http://www.tecore.com/newsevents/release.cfm?newsID-164.
Tecore Networks, The Mobile Industry's First All-In-One Network Solution Supporting WCDMA, HSPA+ and L TE, first release Feb. 14, 2011, http://www.tecore.com/solutions/TecoreNetworks-Datasheet-2G-3G-4G-Networkl nABox.pdf.
International Search Report and Written Opinion dated Feb. 11, 2014, International Application No. PCT/US2013/055864.
International Search Report and Written Opinion dated Nov. 8, 2013, International Application No. PCT/US2013/055721.
International Search Report and Written Opinion dated Sep. 26, 2014, International Application No. PCT/US2014/035732.

\* cited by examiner

TARGETED USER EQUIPMENT-BASE STATION COMMUNICATION LINK

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

A base station can broadcast signals or messages and one or more user equipment (UE) in a corresponding coverage area can receive and interpret the signals.

DETAILED DESCRIPTION

Figure 1:
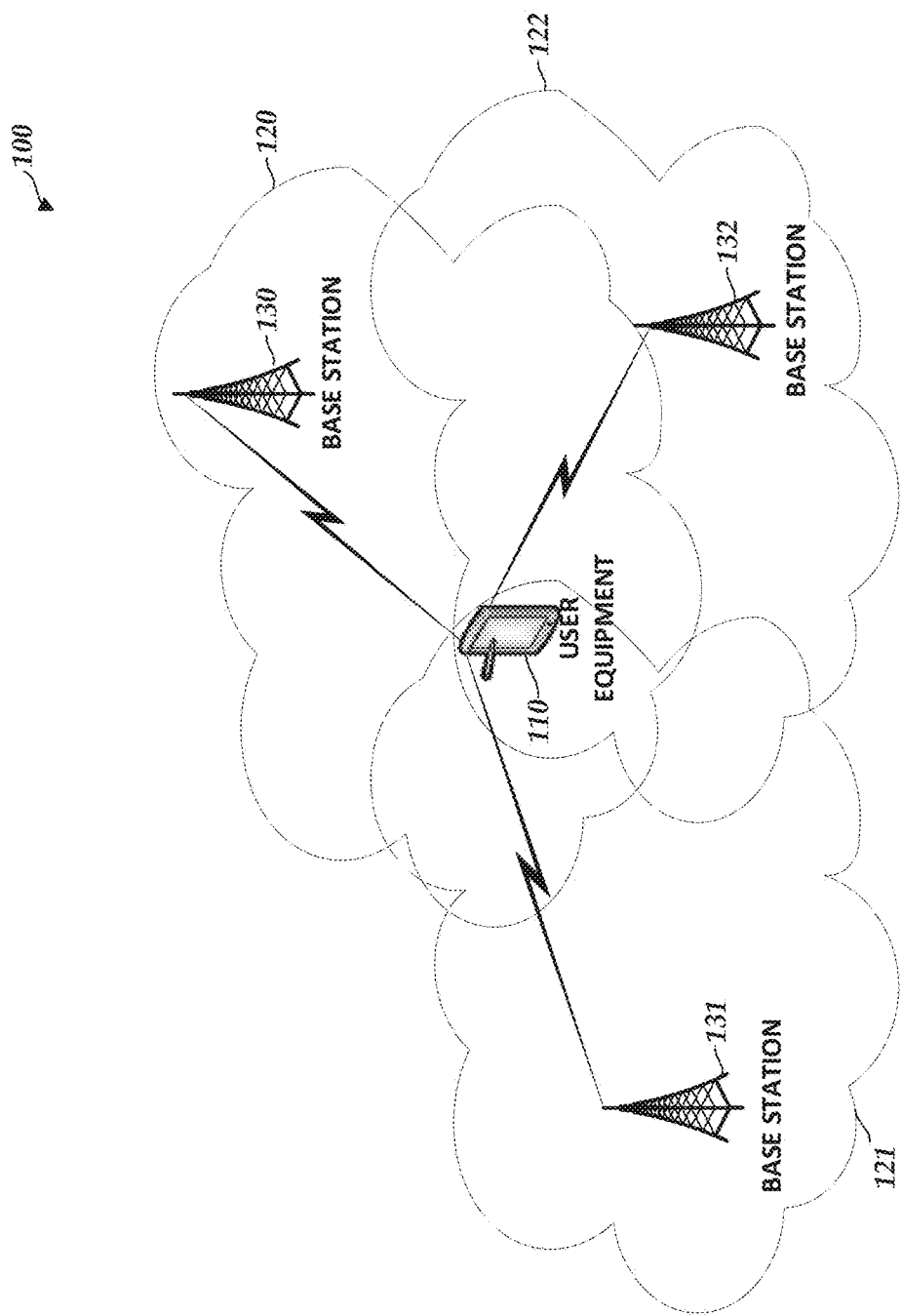
FIG. 1 is a diagram illustrative of an embodiment of an environment that shows a user device located within a cell or coverage area of a base station, as well as the coverage areas of other base stations.

Commercial off the shelf (COTS) user equipment (UE) devices often attempt to connect to any base station they can "see" to obtain wireless services. In some environments, such as military or emergency services, such "chatty" devices are undesirable. Rather, there is a desire to quiet devices and ensure that they limit communications to designated systems. In addition, it is desirable to discourage non-designated UE from attempting to connect to tactical base stations, such as base stations in a disaster zone or military conflict zone.

To reduce undesired communications, UE and base stations can be implemented as UE-base station pairs. The base station(s) of a UE-base station pair can be configured to discourage UE from connecting thereto and/or limit communication links to UE that are part of the UE-base station pair. In some cases, by limiting communication links to UE that are part of the UE-base station pair, the implementation of a UE-base station pair can effectively prioritize communication between particular UE(s) and particular base stations. Similarly, the UE(s) of a UE-base station pair can be configured to filter or ignore broadcast signals from base stations that are not part of the UE-base station pair and/or limit the initiation of a wireless connection to base stations of the UE-base station pair. This reduction of wireless connections and/or attempted wireless connections can be advantageous in various scenarios, such as in emergency situations. For example, UE(s) in a UE-base station pair can be associated with emergency personnel. By limiting communications with the base station to UE associated with emergency personnel, the system can advantageously allow for communications during times when cell towers are congested, such as during catastrophes or natural disasters. Although described as a UE-base station pair, it will be understood that a single UE-base station pair can include one or more base stations and one or more UE.

In some cases, to form a UE-base station pair, the one or more UE and/or the one or more base stations of the base station pair can be provided and/or programmed with information (for example, UE identifiers, base station identifiers, etc.) that can be used to identify UE and/or base stations of the UE-base station pair. For example, a UE can be programmed to respond to or ignore an exclusivity parameter from the base station. Similarly, a base station can be programmed to accept communication requests from the UE despite broadcasting an exclusivity parameter, such as, but not limited to, a cell barred signal. However, it will be understood that a UE-base station pair can be formed using various techniques.

Base stations can routinely broadcast information in the form of broadcast signals or messages (non-limiting example: master information blocks or MIBs or system information blocks or SIBs) over one or more frequency bands within a coverage area. The information can be broadcast multiple times a second (non-limiting example: every 40 ms) and can include bandwidth information for the base station at a particular frequency band, signal decoding information, such as a Physical HARQ Indicator Channel (PHICH), that can be used to decode future signals and symbols, and system frame timing, etc. This information can enable UE within the coverage area to determine the strength and quality of the base station signal where the UE is located. The UE in the coverage area can use the signal quality and strength, as well as other information (non-limiting examples: service type, PLMN acceptability, etc.), to determine whether the UE should attempt to establish a communication link with the base station. Further, using the information in the received signal, the UE can determine how to read additional data signals that the base station broadcasts.

Additional signals broadcast by the base station can provide the UE with relevant information regarding the base station and the cell, or coverage area, where the UE is located. For example, the additional signals can provide access credentials, a schedule for other following signals, mobile network code (MNC), mobile country code (MCC), multi-band carrier code (MBC), type allocation code (TAC) for the cell, radio resource control (RRC), uplink power control, preamble power ramping, uplink cyclic prefix length, sub frame hopping, uplink Evolved Absolute Radio Frequency Channel Number (EARFCN) center frequency, cell re-selection information, exclusivity parameter, cell barred timer, access class barred, cell ID, intra-frequency neighbors, basic handover information; etc. In some embodiments, the additional signals can be signal information blocks (SIBs). In some cases, an exclusivity parameter can include any signal, indicator, or message that indicates that a base station is not accepting connections from at least some UEs, such as UEs that are not part of a UE-base station pair. For example, the exclusivity parameter can include, but is not limited to, a cell barred signal or indicator, a "do-no-connect" signal, or an "unavailable" signal, each of which can indicate that the base station is in an exclusive state. In some cases, when the base station is in an exclusive state, UE (other than UE of the UE-base station pair) within the coverage area of the base station may be unlikely to (or will not) attempt to establish a wireless connection to the base station. However, UE of the UE-base station pair can attempt to establish a wireless connection to the base station in the exclusivity state. For example, UE of the UE-base station pair can either ignore the exclusivity parameter indicating that the base station is in an exclusive state or use the exclusivity parameter as a sign to connect to the base station.

Using the various signals received from the base station, the UE can initiate a wireless connection, or preliminary communication link, with the base station. In some embodiments, the preliminary communication link can be a low-level radio frequency (RF) connection. The preliminary communication link can enable the UE to establish bi-directional communication with the base station.

Once the preliminary communication link is established with the base station, the UE can initiate a connection request to establish a primary communication link with the base station, such as a radio signal bearer connection. However, in some cases, the UE can initiate a connection request to establish a primary communication link without a preliminary communication link having been established. The primary communication link can enable the UE to connect to the network associated with the base station and communicate with other devices that are accessible via the network, such as other UE, servers, etc. In some cases, initiating the primary communication link can be referred to as an RRC connection request.

In some cases, as part of establishing the primary communication link, the network core can authenticate the UE for the network. For example, the UE can request a registration with the network associated with the base station. In response, the network core can determine whether the UE is registered with, or authorized to use, the network and whether it should be permitted to access the network.

The base stations of a UE-base station pair can be configured to broadcast an exclusivity parameter indicating that the base station is not available for connection. In some cases, the exclusivity parameter can be broadcast in the form of a data packet, such as an SIB. In certain embodiments, the exclusivity parameter can indicate that the base station is in an exclusivity state.

As mentioned above, the UE in the coverage area, or cell, receive the signals or messages broadcast by the base station. For example, UE can be configured to scan one or more frequency bands for signals broadcast from any base station. Upon receipt of an exclusivity parameter indicating that the base station is unavailable or in an exclusivity state, UE within the cell that are not part of the UE-base station pair are unlikely to (or do not) attempt to establish a wireless connection to the base station (either the preliminary or primary communication link). Furthermore, UE in the cell that already have a communication link with the base station and that are not part of the UE-base station pair can attempt to discontinue use of the base station, such as by establishing a communication link with another base station.

Further, in some cases, as part of establishing the communication link, the UE can provide the base station with an access identifier or other identifier (for example, UE identifier or UE-base station pair identifier) that can be used by the base station to validate the UE for the connection. For example, the base station of a UE-base station pair can store an identifier, and UE that provide a matching or predetermined identifier can be validated and/or permitted to connect to the base station. In other words, the base station can use the identifier received from the UE to identify whether the UE is part of the UE-base station pair. UE that do not provide the particular identifier can be rejected or ignored by the base station. Accordingly, UE that ignore the exclusivity parameter (for example, a cell barred signal or indicator, a do-not-connect signal, or an "unavailable" signal) and attempt to connect to the base station can still be denied access.

By broadcasting an exclusivity parameter and limiting connections to UE that have a particular access identifier, the base station can reduce the amount of UE attempting to connect and that are allowed to connect. It will be understood that the base station can employ fewer, more, or different techniques to identify UE of the UE-base station pair. For example, the base station may not broadcast an exclusivity parameter and limit access to UE that provide a particular access identifier or may allow any UE that ignores the exclusivity parameter to connect regardless of the access identifier of the UE. In some cases, the base station can use a UE identifier that uniquely identifies the UE or a UE-base station identifier used by all UE and/or base stations of a UE-base station pair to determine whether to allow a UE to connect, etc.

UE of a particular UE-base station pair can be preconfigured with the access identifier that the base station allows to connect and with one or more base station identifiers that identify the base stations of the UE-base station pair. Furthermore, the UE of the UE-base station pair can be configured to scan one or more frequency bands for signals broadcast from any base station, identify the identity of the base stations broadcasting the signals, and identify base stations that are broadcasting an exclusivity parameter.

Further, in some cases, UE of a UE-base station pair can store an identifier (for example, a base station identifier or a UE-base station pair identifier), and base stations that provide (for example, via the signals broadcast by the base station) a matching or predetermined identifier to the UE can be validated and/or permitted to connect to the UE. In other words, the UE can use the identifier received from the base station to identify whether the base station is part of the UE-base station pair. In some cases, base stations that do not provide the particular identifier can be rejected or ignored by the UE. Accordingly, UE configured to ignore an exclusivity parameter (for example, a cell barred signal or indicator, a do-not-connect signal, or an "unavailable" signal) can determine not to initiate a connection with a base station that broadcasts an exclusivity signal.

The UE can further be configured to initiate a communication link with at least one base station that is broadcasting the exclusivity parameter (for example, a cell barred signal or indicator, a do-not-connect signal, or an "unavailable" signal) and that is part of the UE-base station pair (for example, identified using the base station identifiers). It will be understood that the UE can employ fewer, more, or different techniques to identify base stations of the UE-base station pair. For example, the UE may initiate a communication link with base stations broadcasting the exclusivity parameter regardless of the base station identifier or initiate a communication link to base stations that have a particular base identifier regardless of whether the base station is broadcasting an exclusivity parameter.

Furthermore, the UE can be configured to analyze the signal quality and strength of the base stations and use the determined quality to determine to which base station to connect. For example, in some embodiments, the UE may receive broadcast signals from multiple base stations that are part of the UE-base station pair. The UE can use the signal quality and strength data to determine to which of the base stations to connect. In some embodiments, the UE can use a signal quality and strength threshold to determine whether to connect to a particular base station. For example, if the signal quality and strength of a particular base station does not satisfy the signal quality and strength threshold, then the UE can determine that it will not attempt to connect to the particular base station. This signal quality determination can be made before or after the UE identifies base stations that are part of the UE-base station pair. In some cases, the signal quality and strength threshold can correspond to a particular signal quality and strength level that is sufficient to enable communications between the UE and the base station. Further, in some cases, such as when the UE receives broadcast signals from only one base station that is part of the UE-base station pair, the UE can attempt to connect to the base station regardless of the signal quality and strength.

As part of establishing the communication link, the UE can provide the base station with the access identifier or other identifier (e.g., UE identifier UE-base station pair identifier) used by the base station to validate the UE for the connection. Once the preliminary communication link is established, the UE can initiate a connection request to establish a primary communication link with the base station. As described above, as part of establishing the primary communication link, the network core can authenticate the UE for the network.

Environment Overview

FIG. 1 is a block diagram illustrative of an embodiment of an environment 100 that shows a user device 110 located within a cell or coverage area 120 of a base station 130, as well as the coverage areas 121 of other base stations 131. Although only one UE 110 is shown in FIG. 1, it will be understood that multiple UE 110 can be located within the coverage areas 120, 121, 122.

The base stations 130, 131, 132 can include an antenna to communicate wirelessly with the user device 110, one or more data stores, and one or more processors to process the signals received by and sent to the UE 110. In some embodiments, the base stations 130, 131, 132 are implemented as eNodeBs that are in wired communication with one or more components of a network core. The components of the network core may be remotely from the base stations 130, 131, 132, or co-located, such as those described in greater detail in U.S. Pub. No. 2014/0323137, entitled "MOBILE CELLULAR NETWORK BACKHAUL," filed Apr. 29, 2014, which is hereby incorporated by reference in its entirety.

In certain embodiments, the base stations 130, 131, 132 are implemented as mobile cellular network (MCN) communication systems, which are described in greater detail in U.S. Pub. No. 2014/0323137 and/or a communication system, such as communication system 200, described herein. One example of a commercially available MCN communication system is the Xiphos™ available from Oceus Networks. Xiphos refers to an MCN communication system, and any reference to Xiphos is not limiting or referring to a specific product line or implementation of a Xiphos product. In such embodiments, the base stations 130, 131, 132 can provide independent communication links between devices located within the coverage area 120, or communicate to provide communication links between devices in different coverage areas 120, 121, 122. For example, the base stations 130, 131, 132 can provide independent communication links between two UE 110 located within a particular coverage area 120, 121, 122, or between a UE in a coverage area 120, 121, 122 and a server or service that is in communication with the corresponding base station 130, 131, 132. In some embodiments, the server or service is co-located with the base stations 130, 131, 132, such as physically coupled to the base stations 130, 131, 132, located in the same room, tent, or building with the base stations 130, 131, 132. In certain embodiments, the server or service is remotely located from the base stations 130, 131, 132. Furthermore, the MCN communication systems can be mobile during operation, thereby providing a cellular network that is mobile or can be moved. Accordingly, although reference is made in the various drawings to communicating with initiating a connection to, or connecting to a base station, it will be understood that the UEs can communicate with, request a connection to, or connect to one or more communications systems that provide a cellular network that is mobile during operation.

In certain embodiments, the UE 110 can include a processor, one or more data stores, and a communication interface, such as a transceiver that includes an antenna, for wireless communication with the base stations 130, 131, 132, etc. In some embodiments, the UE 110 can include, but is not limited to a cellular phone, tablet, laptop, or other device that is configured to establish wireless communications with the base stations 130, 131, 132. Additional description and examples of the UE 110 can be found in U.S. Pub. No. 2014/0323137, incorporated herein by reference.

Communication System Overview

A cellular network typically includes multiple stationary antennas, base stations, or the like, in different locations that communicate with a mobile telephone switching office (MTSO) and/or one or more core network components (generally referred to as the core or core network) that are remotely located from the different base stations. The MTSO or mobile core determines how calls are routed between the base stations and enables the base stations to communicate with each other for handover purposes. If a base station cannot communicate (non-limiting example: via a backhaul) with the MTSO or mobile core, or the rest of the network, all communications at that base station are lost and UE in corresponding network areas cannot communicate with other UE, even if the UE trying to communicate with each other are in the same network area. In addition, the base stations are built to be stationary so that UE within a particular geographic area always have network access.

When a user moves from one network to another network, the mobile cores of the two networks communicate with each other to handle the handover and other configuration details (non-limiting example: a core network component of the first cellular network communicates with a core network component of the second cellular network). In addition to communicating for handover purposes, core network components from different cellular networks may also communicate in order to route data (non-limiting examples: voice data, video data, application data, control data, etc.) from a user in a first cellular network to another user in a second cellular network.

Figure 2:
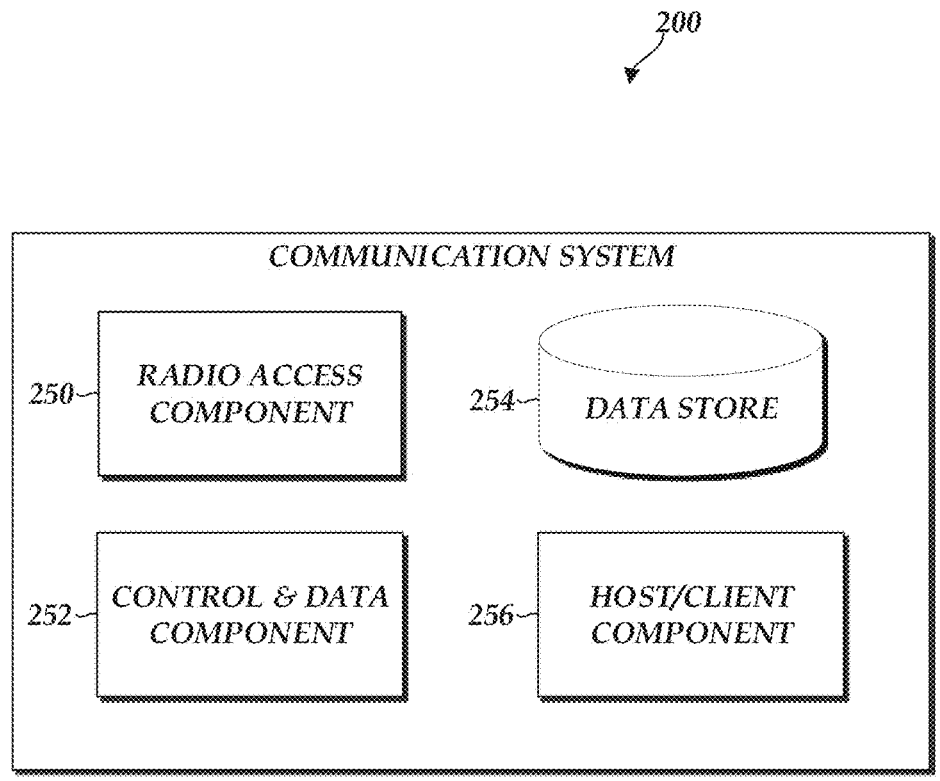
FIG. 2 is a block diagram of an embodiment of a communication system.

FIG. 2 is a block diagram of an embodiment of a communication system 200 that can independently provide a cellular network that is mobile. In certain embodiments, the communication system 200 can also be referred to as an MCN communication system. In the illustrated embodiment, the communication system 200 includes a radio access component 250, which can be used to send/receive wireless communication to/from the communication system 200, a control and data component 252, and a data store 254. The communication system 200 can include fewer, more, or different components as desired and as described in greater detail in U.S. Pub. No. 2014/0057636, entitled Mobile Cellular Networks, and U.S. Pub. No. 2014/0323137, each of which is incorporated by reference herein in its entirety. For example, the communication system 200 can include and/or can communicate with an antenna, satellite dish, and the like, to receive data from UE or other endpoints, other communication systems, satellites, and the like. In certain embodiments, the communication system 200 can communicate with multiple eNodeBs, base stations, or the like, to increase its coverage area. In addition, in an IP network architecture, the received/transmitted data can all be in the form of IP data packets.

One or more communication systems 200 can be deployed in areas where cellular networks are not available and each communication system can independently provide a self-contained cellular network that is portable during operation for devices in respective coverage areas. In some cases, multiple communication systems can be networked together to create a network of communication systems, also referred to herein as a NOM, as described in greater detail in U.S. Pub. Nos. 2014/0057636 and 2014/0323137, each of which is incorporated herein by reference. The different communication systems within the NOM or between NOMs, can communicate with each other via a backhaul using a variety of communication technologies, including satellite communication, microwave or radio wave communication, OFDM, WiMAX, LTE, etc., as described in greater detail in U.S. Pub. Nos. 2014/0057636 and 2014/0323137, each of which is incorporated herein by reference, and, in some cases, NOMs can communicate with each other. As further described in U.S. Pub. Nos. 2014/0057636 and 2014/0323137, each of which is incorporated herein by reference, when networked together, some communication systems 200 can be configured as master devices or hosts and other communication systems 200 can be configured as secondary devices, clients and/or relays.

In some embodiments, each of the components of the communication system 200 can include an identifier, such as an IP address, MAC address, etc. Furthermore, in certain embodiments, the network (in some embodiments a MCN) provided by the communication system 200 can include one or more network identifiers, such as access point names, etc. In some embodiments, different types of data can be associated with different access point names. For example, voice-over-IP (VOIP) data can be associated with one access point of the communication system, Internet data can be associated with a different access point of the communication system, etc. Similarly, video data, video data, audio data, file transfer data, text or short message service (SMS) data, multimedia or multimedia message service (MMS) data, etc., can each be assigned to a different APN, or grouped together in any combination on the same APN, as desired. In some cases, the use of different APNs can be based on network policy, such as, but not limited to, treatment of different types of packets or data, treatment of different users. In certain cases, the use of different APNs can be based on billing systems (e.g., the ability to charge for different types of data), carrier grade redundancy (e.g., making data paths for some type of data more resilient than others, such as to make voice data more reliable than Internet data). Furthermore, in some cases, some types of data can be blocked, such as during authentication, depending on the network deployment. Signals sent over the network can use the network identifiers of the communication system 200 to identify the communication system 200 that is to process the packet and/or that can access a particular destination, etc.

In some embodiments, the communication system 200 can function in an independent mode where communication with other communication systems or a backhaul communication is limited or non-existent. In such embodiments, upon receiving a packet of data, the first communication system can refer to a look-up table stored in a data storage device to determine whether a destination identifier of the packet is within its coverage area. If the destination is within the coverage area (non-limiting examples: an endpoint within the coverage area, a component of the communication system, etc.), the communication system can transmit the data to the destination. The data can include any one or more types of communications, including, but not limited to, user plane data (non-limiting examples: voice data, video data, e-mail, SMS data, picture data, files, requests for information, etc.) or control plane data. If the first communication system determines that the destination is not within its coverage area, the first communication system can transmit a message to the source that communication with the destination is not available, etc.

The communication system can also function in a networked mode such that communication with a destination is available even if the destination is not located within the communication system's coverage area. In some instances, the destination may be accessible via the Internet (non-limiting examples: via satellite or wired communication), microwave communication, LTE backhaul, or other form of backhaul technology, etc.

In some embodiments, multiple communication systems 200 can be related together. In addition, in certain embodiments, when in the networked mode multiple communication systems 200 can be associated together and/or networked together as described in greater detail in U.S. Pub. No. 2014/0057636, incorporated herein by reference.

Furthermore, when related together, the communication systems can have different functionality depending on their relationship with the other communication systems. For example, as described in greater detail in U.S. Pub. Nos. 2014/0057636 and 2014/0323137, incorporated herein by reference, when related together, one of the communication systems can be designated as a host communication system or Master Device, while the remaining communication systems can be designated as client communication systems, relay communication systems, and/or Secondary Devices.

Furthermore, when multiple communication systems 200 are networked together, a UE can move from the coverage area of a first communication system 200 to the coverage area of a second communication system 200 without disrupting the service of the UE. As the UE moves from the coverage area of the first communication system to the coverage area of the second communication system 200, the first and second communication systems 200 can effectuate a handover that updates which communication system 200 provides the UE with network access. For example, as part of the handover routine the UE can establish a first cellular communication link with the first communication system 200 and terminate a second cellular communication link with the second communication system 200. Any communication systems 200 to which the UE is registered (non-limiting example: a registered communication system) can similarly update its routing table and any session identifiers in order to continue providing a communication pathway or link for the UE.

With continued reference to FIG. 2, the control and data component 252 can be implemented using one or more computer processors, FPGAs, microcontrollers, etc., and can perform the various operations of the communication system 200. In an IP network architecture, such as 4G LTE, the control and data component 252 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-communication system handovers. For idle state UE, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the communication system 200 and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the communication system 200.

Similarly, the control and data component 252 can perform the attachment and detachment of UE, authentication procedures, gateway selection, managing PDN connections, UE tracking and paging, etc. The control and data component 252 can also handle the user data between the radio access component and an external IP network, packet routing and forwarding, handover functions between communication systems 200, packet buffering initiation of network triggered service request procedures, quality of service policy enforcement, static policy, subscriber location management, subscriber data, and the like. In addition, the control and data component 252 can perform additional procedures as described in greater detail in U.S. Pub. No. 2014/0057636, incorporated herein by reference.

The data store 254 can include data regarding the UE in communication with the communication system 200 and within the coverage area corresponding to the communication system 200, such as UE location, authentication keys, etc. In some embodiments, such as in an IP network architecture such as a 4G LTE network, the data store 254 can include a home subscriber server (HSS). In addition, the data store 254 can include information regarding other communication systems 200 that are registered with the communication system 200.

The HSS can include subscription information for all UE (including client communications systems that are registered as UE) associated with the communication system 200, such as all the UE located within the coverage area of a communication system 200 and/or the UE located within the coverage area of related or associated communication systems 200. The HSS can store, for example, authentication parameters, security keys, and subscription information for UE within the communication system 200 or associated with the communication system 200. Furthermore, the HSS can include subscriber location information and be involved with subscriber data handling, authentication procedures, etc.

Similarly, the data store 254 can further include data identifying other related communication systems 200. In some cases, the data identifying the other related communication systems 200 can be used to communicate with the other communication systems 200.

Example Communications Between a UE and a Base Station

Figure 3:
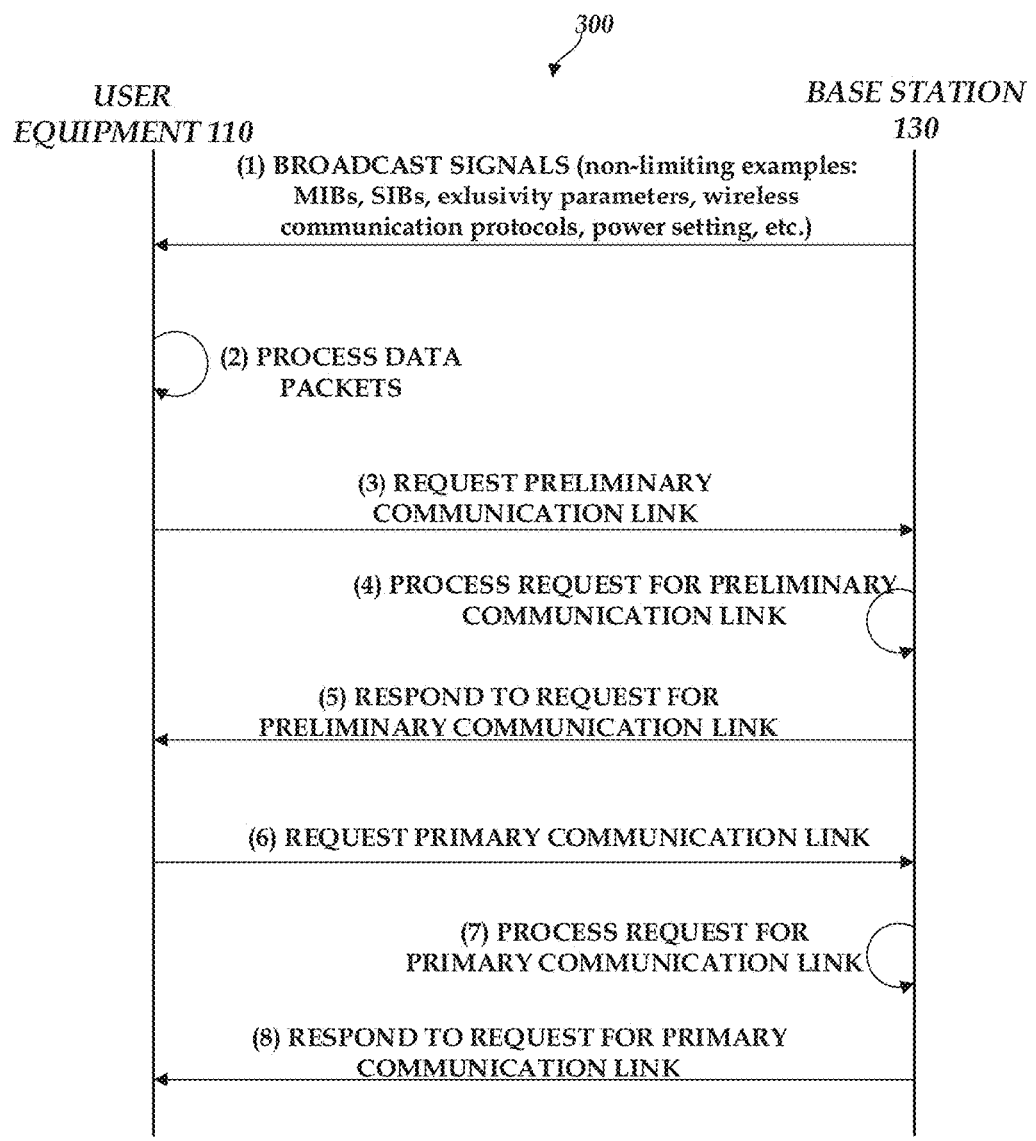
FIG. 3 illustrates a sequence diagram for example communications between a UE and a base station.

FIG. 3 illustrates a sequence diagram for example communications between a UE 110 and a base station 130. Although only one UE 110 and base station 130 are shown in FIG. 3, it will be understood that the environment 200 can include fewer or more components as desired and/or be configured differently. For example, the sequence in FIG. 3 can occur between the base station 130 and multiple UE 110 and/or between a UE 110 and multiple base stations, such as base stations 130, 131, 132. Furthermore, additional, fewer, or different communications can occur between UE 110 and a base station 130, and/or additional components can be used to communicate the data between UE 110 and base station 130.

At (1), the base station 130 broadcasts signals to the UE 110. In some cases, the base station 130 can broadcast the signals to multiple UE 110 located within a coverage area 120. In certain embodiments, all UE 110 within a coverage area 120 receive the broadcast signals from the base station 130. In some embodiments, the broadcast signals are not directed to any particular UE 110, but are for any UE 110 that receives them. As described herein, the broadcast signals can include information related to bandwidth for the base station 130, signal decoding information to decode future signals and symbols, system frame timing, access credentials, a packet schedule, uplink power control, preamble power ramping, uplink cyclic prefix length, sub frame hopping, uplink EARFCN center frequency, cell re-selection information, exclusivity parameters, cell barred timer, access class barred, cell id, intra-frequency neighbors, basic handover information, etc.

At (2), the UE 110 processes the received signals. In certain embodiments, the UE 110 processes broadcast signals from multiple base stations 130, 131, 132. As part of the broadcasting, the UE can determine the power and/or quality of the signals received from the base station 130, determine whether the base station 130 is in an exclusivity state, determine the identity of the base station 130, etc. In some embodiments, when in an exclusivity state, the base station 130 indicates that it is not available for use or is only available for certain UE, such as UE with a proper access identifier or access level, or that are part of a corresponding UE-base station pair.

At (3), the UE 110 requests a preliminary communication link with the base station 130. In some cases, the UE 110 requests the preliminary communication link based on a determination that the signals from the base station 130 satisfy a signal and power quality threshold, that the identification of the base station 130 matches a predetermined identifier, and/or that the base station 130 is in an exclusivity state. In certain cases, the UE 110 can determine not to request a preliminary communication link with the base station based on a determination that the base station 130 is not in an exclusivity state, the signals from the base station 130 do not satisfy a signal and power quality threshold, and/or that the identification of the base station 130 does not match a predetermined identifier.

Further, when processing signals from multiple base stations 130, 131, 132, the UE 110 can request preliminary communication links with the base stations 130, 131, 132 that broadcast a signal that satisfies a signal and power quality threshold, that includes an identifier that matches a predetermined identifier for a UE-base station pair, and/or that is in an exclusivity state. In certain embodiments, the UE 110 can ignore or filter out base stations 130, 131, 132 that do not satisfy at least one of the criteria. In some cases, the UE can ignore or filter out base stations 130, 131, 132 that are not in the exclusivity state and/or do not have an identifier that matches an identifier stored by the UE. Further, the UE 110 can prioritize base stations 130, 131, 132 based on the signal quality and strength. For example, the UE 110 can identify all base stations 130, 131, 132 that are in an exclusivity state and/or that have an identifier that matches an identifier of a UE-base station pair. The UE 110 can then prioritize the identified base stations 130, 131, 132 based on the power and quality of the signals and request communication with the identified base stations 130, 131, 132 based on the prioritization.

At (4), the base station 130 can process the request, and at (5) the base station 130 can respond to the request. Based on the response, a preliminary communication link can be established between the UE 110 and the base station 130 that permits the UE 110 to communicate with the base station 130, such as a low-level radio frequency (RF) connection. However, in some embodiments, the preliminary communication link does not enable the UE to communicate with other devices within the network that is accessible via the base station 130.

Further, based on the response, the user equipment can (6) request a primary communication link. In some cases, prior to requesting the primary communication link, the UE 110 can determine whether to request the primary communication link based on the information described above, such as signal power and quality, base station identifier, and or the exclusivity state of the base station 130. As part of the request, the UE 110 can include sufficient information to enable the base station 130 to authenticate the UE 110. The information can include an identifier, network credentials, access identifiers, etc.

At (7), the base station 130 or communication network associated with the base station 130, can process the request and determine whether to establish the primary communication link with the UE 110. For example, in some embodiments, the base station 130 can determine by itself whether to establish the primary communication link with the UE 110, and in certain embodiments, the base station 130 can communicate the request for a primary communication link to a core network or other network component, which can determine whether to establish the primary communication link with the UE 110.

In some cases to determine whether to establish the primary communication link with the UE 110, the base station 130, or associated communication network components, can consult one or more databases to authenticate the UE 110. For example, the base station 130 or other communication network component can determine whether the UE 110 is registered with the network, such as, by determining whether a SIM card or other identifier of the UE 110 is located in the one or more databases and identified as a registered user, etc. of the communication network. In certain embodiments, the base station 130 can determine whether the UE 110 includes an access identifier to permit it to access the network. For example, even if a UE 110 can be authenticated with the network, the base station 130 can still deny access if the UE 110 does not have the proper access or permissions level.

Based on the processing, the base station can (8) respond to the UE 110 request. The response can establish the primary communication link between the UE 110 and the base station 130, provide the UE 110 with sufficient information to establish the primary communication link with the base station 130, and/or reject the UE 110. As mentioned previously, in some cases, the UE 110 can be rejected based on the access identifier and/or authentication, etc. Once the primary communication link is established, the UE 110 can communicate with other devices within the network, such as other UE, servers, etc., via the base station 130.

Depending on the embodiment, certain acts, events, blocks, communications or functions identified above can be performed in a different sequence, can be added, merged, or left out altogether (non-limiting example: not all described operations or events are necessary). For example, in some cases, any one or any combination of events (1), (2), (3), (4), (5), (6), (7), or (8) can be omitted. Further, in some embodiments, the UE 110 may not send a request for preliminary communication link to the base station 130. For example, the UE 110 can process signals received from the base station and request a primary communication link. Moreover, in certain embodiments, operations or events can be performed concurrently, e.g., the UE 110 can concurrently request a preliminary and a primary communication link. In some embodiments, the base station 130 can establish the primary communication link at the same time that it responds to the UE's 110 request for preliminary communication link.

Furthermore, any one or any combination of the activities described above can occur automatically and/or without user input. For example, the UE 110 can receive the broadcast signals, process the signals, request the preliminary communication link, request the primary communication link, and/or establish the preliminary or primary communication link without user input.

Exclusivity State

Figure 4:
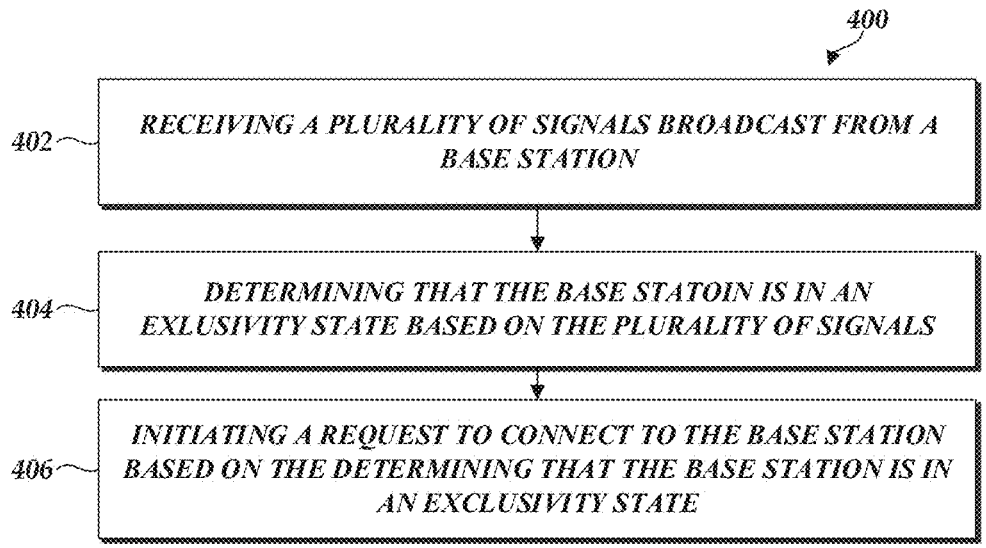
FIG. 4 is a flow diagram illustrative of an embodiment of a routine implemented by a UE for requesting a communication link with a base station.

FIG. 4 is a flow diagram illustrative of an embodiment of a routine 400 implemented by a UE 110 for initiating a request to establish a communication link with a base station 130. Additional, fewer, or different communications can occur between UE 110 and base station 130, and/or additional components can be used to communicate the data between UE 110 and base station 130.

At block 402, the UE 110 receives a plurality of signals broadcast from a base station 130. As described herein, a base station 130 can broadcast information in the form of signals over one or more frequency bands within a coverage area of the base station 130. The information can be broadcast at various times, such as multiple times a second.

At block 404, the UE 110, which can be located in the coverage area of the base station 130, determines that the base station 130 is in an exclusivity state. For example, the signals broadcast by the base station 130 and received by the UE 100 can include an exclusivity parameter, which can indicate that the base station 130 is in an exclusivity state or is otherwise not available for connection. In some cases, the exclusivity parameter can be broadcast in the form of a signal information block (SIB), and can include or be referred to as a cell barred signal, a do-not-connect signal, or an unavailable signal.

At block 406, the UE 110 initiates a request to connect to the base station 130 based on a determination that the base station is in an exclusivity state. For example, upon receipt of the exclusivity parameter indicating that the base station 130 is unavailable or in an exclusivity state, the UE 110 can request to connect to the base station 130. As described herein, the request can be a request for a preliminary communication link and/or a primary communication link. It should be noted that, in some embodiments, due to the exclusivity parameter, other UE within the coverage area of the base station 130 may be unlikely to (or will not) attempt to establish a wireless connection to the base station 130. Accordingly, in certain embodiments, the UE 110 can ignore the exclusivity parameter (non-limiting examples: a cell barred signal or indicator, a do-not-connect signal, or an "unavailable" signal) and can attempt to connect to the base station 130.

Depending on the embodiment, certain acts, events, blocks, or functions of any of the routine 400 can be performed in a different sequence or in parallel, can be added, merged, or left out altogether (non-limiting example: not all described operations or events are necessary for the practice of the routine 400). In some embodiments, the UE 110 can scan one or more frequency bands prior to receiving the broadcast signals. In certain embodiments, the UE 110 can determine a strength and quality of a signal of the base station based on the plurality of signals and initiate the request to connect to the base station based on determining that the strength and quality of the signal satisfies a signal strength and quality threshold. As yet another non-limiting example, the UE 110 can determine the identity of the base station based on an identifier received via the signals, initiate the request to connect to the base station based on determining that the received identifier matches an identifier stored by the UE 110 or identified by the UE 110 as corresponding to a base station of an associated UE-base station pair. In some cases, the request to connect to the one or more base stations can be a request to establish a preliminary and/or primary communication link with the base station. In certain embodiments, the broadcast signals can be in the form of data packets. The UE 110 can use different packets to determine the different information. For example, one packet can be used to determine the power and quality of the signal, another packet can be used to determine the identity of the base station, and a third packet can be used to determine if the base station is in an exclusivity state. It will be understood that the information can be included in one packet or any combination of packets as desired.

Non-Exclusivity State

Figure 5:
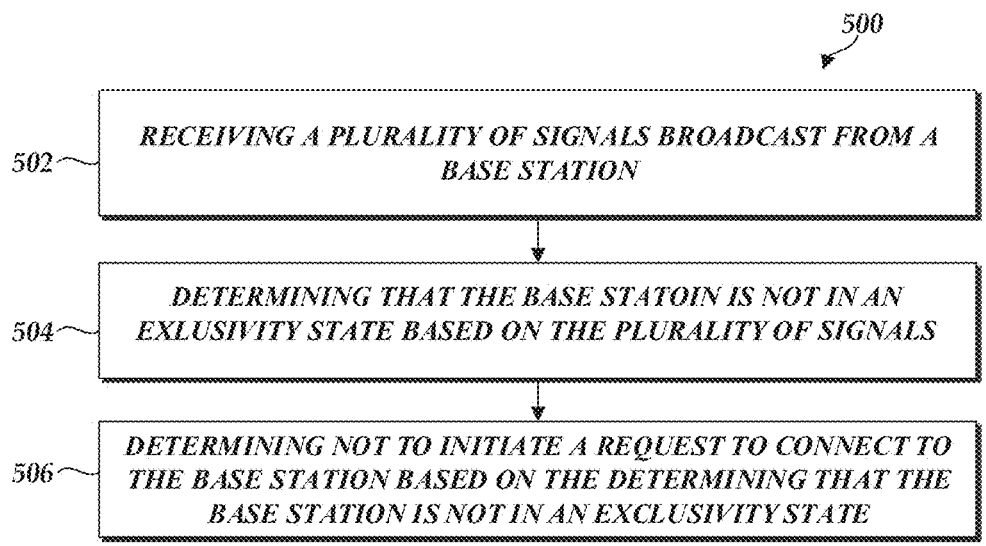
FIG. 5 is a flow diagram illustrative of an embodiment of a routine implemented by a UE for determining not to initiate a request to establish a communication link with a base station.

FIG. 5 is a flow diagram illustrative of an embodiment of a routine implemented by a UE 110 for determining not to initiate a request to establish a communication link with a base station. Additional, fewer, or different communications can occur between UE 110 and base station 130, and/or additional components can be used to communicate the data between UE 110 and base station 130.

At block 502, similar to block 402 of routine 400, the UE 110 receives a plurality of signals broadcast from a base station 130.

At block 504, in contrast to block 404 of routine 400, the UE 110 determines, based on the signals, that the base station 130 is not in an exclusivity state. For example, the signals can indicate that the base station 130 is not in an exclusivity state or is otherwise available for connection. In some cases, the signals can be referred to as an available signal. In some cases, the UE 110 can determine that the base station 130 is not in an exclusivity state based on a determination that the signals do not include an exclusivity parameter.

At block 506, the UE 110 determines not to initiate a request to connect to the base station 130 based on the determination that the base station 130 is not in an exclusivity state. For example, upon receipt of the signals indicating that the base station 130 is available or is not in an exclusivity state, the UE 110 can determine not to initiate a request to connect to the base station 130. It should be noted that, in some embodiments due to the presence of the availability parameter, other UE within the coverage area of the base station 130 may attempt to establish a wireless connection to the base station 130. Accordingly, in certain embodiments, the UE 110 can based on the presence of the availability signal from the base station 130 and not initiate a request to connect to the base station 130.

Depending on the embodiment, certain acts, events, blocks, or functions of any of the routine 500 can be performed in a different sequence or in parallel, can be added, merged, or left out altogether (non-limiting example: not all described operations or events are necessary for the practice of the routine 500). For example, the UE 110 can implement some or all of various blocks of other routines described herein (for example, routine 400, 600, 700, or 800) concurrently or change the order as desired. In some embodiments, the UE 110 can scan one or more frequency bands prior to receiving the broadcast signals. In certain embodiments, the UE 110 can determine a strength and quality of a signal of the base station based on the plurality of signals, and not initiate the request to connect to the base station based on determining that the strength and quality of the signal does not satisfy a signal strength and quality threshold. As yet another non-limiting example, the UE 110 can determine the identity of the base station based on an identifier received via the broadcast signals, and not initiate the request to connect to the base station based on determining that the received identifier does not match an identifier stored by the UE 110 or identified by the UE 110 as corresponding to a base station of an associated UE-base station pair.

In certain embodiments, the UE 110 can use different signals to determine different information. For example, one signal can be used to determine the power and quality of the signals, another signal can be used to determine the identity of the base station, and a third signal can be used to determine if the base station is in an exclusivity state. It will be understood that the information can be included in one signal or any combination of signals as desired. Furthermore, in some cases, the UE 110 may already have a communication link with the base station 130 and can attempt to discontinue use of the base station 130, such as by establishing a communication link with another base station, based at least in part on the received signals.

Exclusivity State

Figure 6:
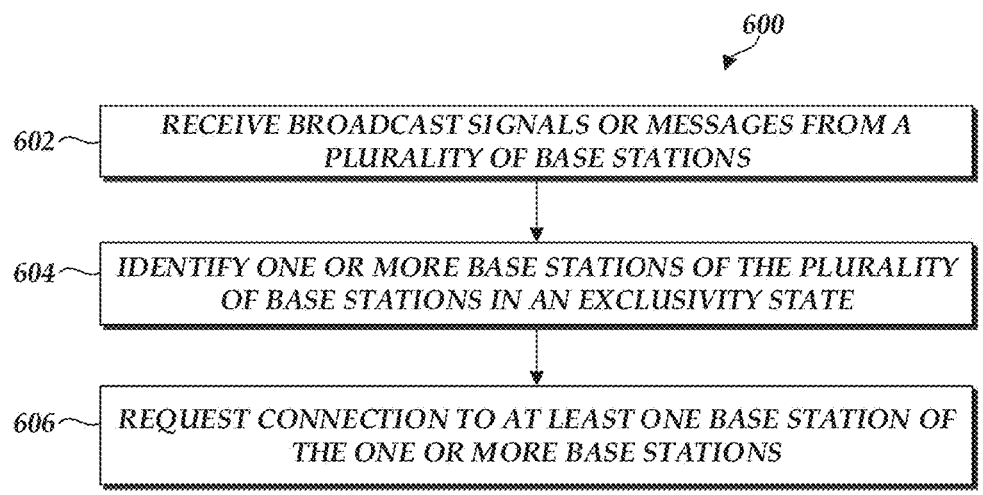
FIG. 6 is a flow diagram illustrative of an embodiment of a routine implemented by a UE for requesting a communication link with a base station.

FIG. 6 is a flow diagram illustrative of an embodiment of a routine 600 implemented by a UE 110 for requesting a communication link with a base station. Additional, fewer, or different communications can occur between UE 110 and one or more base stations, and/or additional components can be used to communicate the data between UE 110 and the one or more base stations.

At block 602, the UE 110 receives a plurality of signals broadcast from a group of base stations that include at least one base station. As described herein, a UE can be located in one or more coverage areas corresponding to one or more base stations. Each base station can broadcast information in the form of signals over one or more frequency bands within its corresponding coverage area. In some cases, each of the base stations of the group of base stations can broadcast the information over the same one or more frequency bands. The information can be broadcast at various times, such as multiple times a second.

At block 604, the UE 110 identifies one or more base stations of the plurality of base stations in an exclusivity state based on the plurality of signals. For example, signals broadcast by one or base stations can indicate that a particular base station is in an exclusivity state or is otherwise not available for connection. For example, signals from the one or more base stations in an exclusivity state can include an exclusivity parameter. In some cases, the exclusivity parameter can be broadcast in the form of a signal information block (SIB). In some cases, UE 110 identifies one or more base stations of the plurality of base stations that are not in an exclusivity state based on the plurality of signals. The UE 110 can be configured to filter or ignore broadcast signals from those base stations that are not in an exclusivity state, regardless over which of the one or more frequency bands those base stations are broadcasting.

At block 606, the UE 110 requests to connect to at least one base station of the one or more base stations that are in an exclusivity state based. For example, upon receipt of an exclusivity parameter indicating that a particular base station is unavailable or in an exclusivity state, the UE 110 can request to connect to the particular base station. In some cases, the UE 110 can also request to connect to one or more other base stations that are identified to be in an exclusivity state. As described herein, the request(s) can be a request for a preliminary communication link and/or a primary communication link. In certain embodiments, due to the exclusivity parameter, other UE within the coverage area(s) of the base station in the exclusivity state may be unlikely to (or will not) attempt to establish a wireless connection to the base station in the exclusivity state. Accordingly, the UE 110 can ignore the exclusivity parameter (non-limiting examples: a cell barred signal or indicator, a do-not-connect signal, or an "unavailable" signal) and can request a connection to one or more of the one or more base stations in the exclusivity state.

Depending on the embodiment, certain acts, events, blocks, or functions of any of the routine 600 can be performed in a different sequence or in parallel, can be added, merged, or left out altogether (non-limiting example: not all described operations or events are necessary for the practice of the routine 600). For example, the UE 110 can implement some or all of various blocks of other routines described herein (for example, routine 400, 500, 700, or 800) concurrently or change the order as desired. In some embodiments, the UE 110 can scan one or more frequency bands prior to receiving the broadcast signals. In certain embodiments, the UE 110 can determine a strength and quality of a signal of the base stations based on the plurality of signals and request to connect to the at least one base station based on determining that the strength and quality of the signal of the at least one base station does satisfies a signal strength and quality threshold.

As yet another non-limiting example, the UE 110 can determine the identity of the plurality of base stations based on identifiers received via the broadcast signals, and request to connect to the at least one base station based on determining that the received identifier matches an identifier stored by the UE 110 or identified by the UE 110 as corresponding to a base station of an associated UE-base station pair. In some cases, the request to connect to the one or more base stations can be a request to establish a preliminary and/or primary communication link with the base station. In certain embodiments, the broadcast signals can be in the form of data packets. For example, the UE 110 can use different packets to determine the different information. For example, one packet can be used to determine the power and quality of the signal, another packet can be used to determine the identity of the base station, and a third packet can be used to determine if the base station is in an exclusivity state. It will be understood that the information can be included in one packet or any combination of packets as desired.

Figure 7:
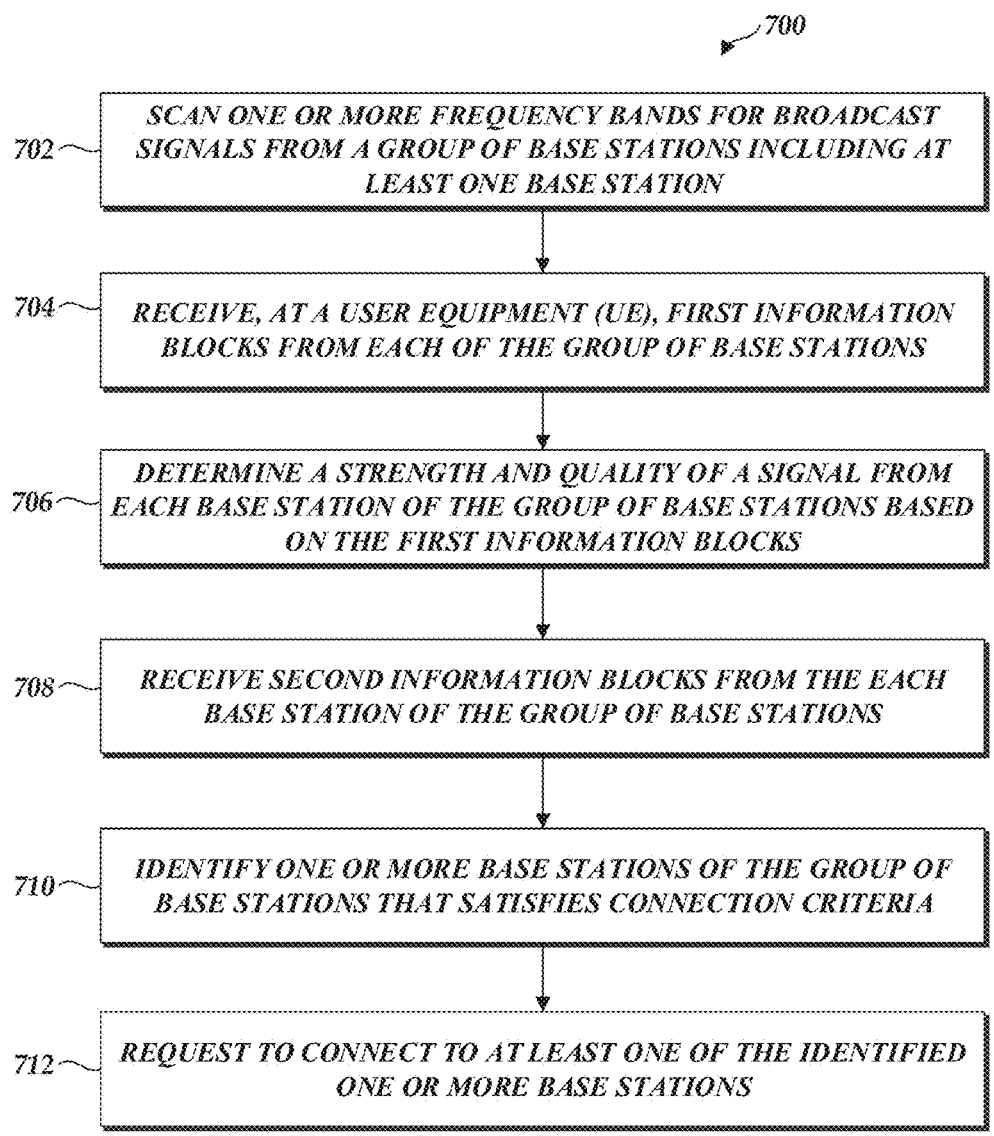
FIG. 7 is a flow diagram illustrative of an embodiment of a routine implemented by a UE for requesting a communication link with a base station.

FIG. 7 is a flow diagram illustrative of an embodiment of a routine 700 implemented by a UE 110 for requesting a communication link with a base station. Additional, fewer, or different communications can occur between UE 110 and one or more base stations, and/or additional components can be used to communicate the data between UE 110 and one or more base stations.

At block 702, the UE 110 scans one or more frequency bands. As described herein, a base station can broadcast information in the form of signals over one or more frequency bands within a coverage area of the particular base station. The information can be broadcast multiple times a second (non-limiting example: every 40 ms). Accordingly, at block 702, the UE can scan or monitor one or more frequency bands to "listen" for broadcast signals.

At block 704, the UE 110 receives first information blocks from each of a group of one or more base stations. For example, each base station can have a corresponding coverage area and the UE can be located in one or more of the coverage areas. The UE can receive first information blocks from each base station that has a coverage area that overlaps with the location of the UE. Each of these base stations can form the group of base stations from which the UE receives the first information blocks. In some cases, each of the base stations of the group of base stations can broadcast the first information blocks over the same one or more frequency bands. In some cases, the first information blocks can be master information blocks or MIBs. The first information blocks can include various information including, but not limited to, bandwidth information for the base station at a particular frequency band, signal decoding information, such as a Physical HARQ Indicator Channel (PHICH), that can be used to decode future signals and symbols, and system frame timing, etc.

At block 706, the UE determines a strength and quality of a signal received from each base station of the group of base stations based on the first information blocks. For example, the information included in the first information blocks can enable UE to determine the strength and quality of the base station signal where the UE is located. In some cases, the UE can use the signal quality and strength, as well as other information (non-limiting examples: service type, PLMN acceptability, etc.), to determine whether the UE should attempt to establish a communication link with the base station. In some cases, using the information in the first information blocks, the UE can determine how to read second information blocks or other signals that the base station broadcasts.

At block 708, the UE receives second information blocks from each of the base stations of the group of base stations. In some cases, each of the base stations of the group of base stations can broadcast the second information blocks over the same one or more frequency bands. In some cases, the second information blocks can be signal information blocks or SIBs. The second information blocks can include various information including, but not limited to, information regarding the base station and the cell, or coverage area, where the UE is located. For example, the second information blocks can provide access credentials, a schedule for other following signals, MNC, MCC, MBC, TAC, RRC, uplink power control, preamble power ramping, uplink cyclic prefix length, sub frame hopping, uplink EARFCN center frequency, cell re-selection information, exclusivity parameters, cell barred timer, access class barred, cell ID, intra-frequency neighbors, basic handover information, or the like. In some cases, an exclusivity parameter can include any combination of the information in the second information blocks. In some cases, the second information blocks can indicate that a base station is in an exclusivity state or is otherwise unavailable to at least some UE (for example, those UE not part of a UE-base station pair).

At block 710, the UE identifies one or more base stations of the group of base stations that satisfies connection criteria. The selection criteria can include various measures which can indicate whether the UE should (or can) establish a communication link with a particular base station.

The connection criteria can include a condition that a strength and quality of the signal (determined at block 706) satisfies a signal strength and quality threshold. Thus, the UE can use the signal quality and strength data to determine to which, if any, of the group of base stations to connect. For example, if the signal quality and strength of a particular base station does not satisfy the signal quality and strength threshold, then the UE can determine that it will not attempt to connect to the particular base station. In some cases, the signal quality and strength threshold can correspond to a particular signal quality and strength level that is sufficient to enable communications between the UE and the base station. However, in some cases, such as when the UE receives first or second information blocks from only one base station, the UE can proceed to block 712 and request attempt to connect to the base station regardless of the signal quality and strength.

The connection criteria can include a condition that the base station is in an exclusivity state. As described herein, when in an exclusivity state, the base station indicates that it is not available for use or is only available for certain UE. As a result, some UE within the coverage area of the base station in the exclusivity state may not (or will not) attempt to establish a wireless connection to the base station based on the connection criteria. In contrast, other UE can based on the connection criteria attempt to connect to the base station.

The connection criteria can include a condition that the base station (or the first or second information blocks) includes an identifier corresponding to a UE-base station pair associated with the UE. For example, each of the base stations of a UE-base station pair can store or be associated with an access identifier. In addition or alternatively, the UE of a particular UE-base station pair can be pre-configured with the access identifier that the base station allows to connect and/or with one or more base station identifiers that identify the base stations of the UE-base station pair. In some cases, the UE can identify the identity (or an access identifier) of the base stations broadcasting the information blocks, and identify whether the identity (or an access identifier) corresponds to a UE-base station pair associated with the UE. In some cases, if the identity of a base station corresponds to a UE-base station pair associated with the UE, then this condition is satisfied. However, it will be understood that fewer, more, or different techniques can be employed to identify whether a UE or a base station is part of a UE-base station pair. For example, the base station may limit access to UE that provide a particular access identifier or other identifier or may allow any UE that ignores the exclusivity parameter (for example, a cell barred signal or indicator, a do-not-connect signal, or an unavailability signal) to connect regardless of the access identifier of the UE. In some cases, the base station can use a UE identifier that uniquely identifies the UE or a UE-base station identifier used by all UE and/or base stations of a UE-base station pair to determine whether to allow a UE to connect, etc.

It will be understood that the connection criteria can include fewer, more, or different conditions than described above. For example, the connection criteria can include any combination of one or more of the identification that one or more base stations of the group of base stations (i) is in an exclusivity state, (ii) includes an identifier corresponding to a UE-base station pair associated with the UE, or (iii) broadcast a signal that satisfies a signal strength and quality threshold. In some cases, the UE can make these identifications, while in other cases a base station can make one of more of these identifications.

At block 712, the UE requests to connect to at least one base station of the identified one or more base stations that satisfies the connection criteria. As described herein, the request(s) can be a request for a preliminary communication link and/or a primary communication link. In some cases, as part of the request, the UE can provide the one or more base station with an access identifier or other identifier (e.g., UE identifier UE-base station pair identifier) used by the base station to validate the UE for the connection. For example, UE that provide a matching or predetermined access identifier can be permitted to connect to the base station, while UE that do not have the particular access identifier can be rejected.

It will be understood that at least some of the blocks of routine 700 can be performed in different orders or in parallel. Furthermore, it will be understood that the routine 700 can include fewer or more blocks as desired. For example, the UE 110 can implement some or all of various blocks of other routines described herein (for example, routine 400, 500, 600, or 800) concurrently or change the order as desired. In some embodiments, the UE 110 can use the first or second information blocks to determine the power and quality of the signals from the group of base stations, identify matching identifiers, and determine exclusivity states. In certain embodiments, the first and second information blocks can be combined into a single information block or a single set of information blocks. In some cases, the request to connect to the one or more base stations can be a request to establish a preliminary and/or primary communication link with the base station. Furthermore, in some cases, the UE 110 can request initiate or establish a primary communication link with the base station based at least in part on a successfully established preliminary communication link with the base station. However, in other embodiments, the request to initiate primary communication link can be independent of whether or not a preliminary communication link has been established.

Figure 8:
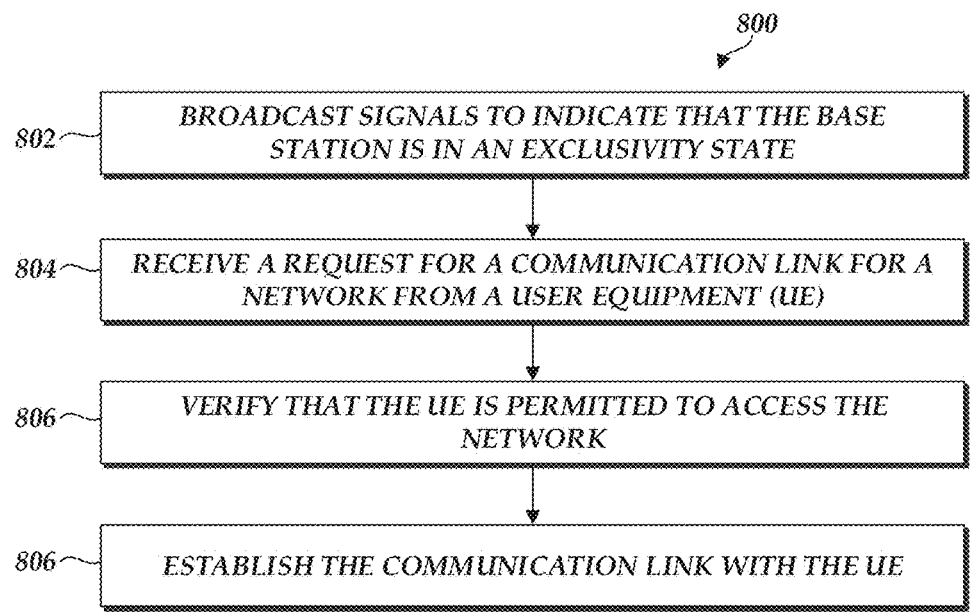
FIG. 8 is a flow diagram illustrative of an embodiment of a routine implemented by a base station for establishing a communication link with a UE.

FIG. 8 is a flow diagram illustrative of an embodiment of a routine 800 implemented by a base station 130 for establishing a communication link with a UE. Additional, fewer, or different communications can occur between one or more UE and base station 130, and/or additional components can be used to communicate the data between the one or more UE and base station 130.

At block 802, the base station 130 broadcasts information in the form of broadcast signals over one or more frequency bands within a coverage area of the base station 130. The information can be broadcast multiple times a second, such as every 40 ms. The information can include various information including, but not limited to, bandwidth information for the base station at a particular frequency band, signal decoding information that a UE can use to decode future signals and symbols from the base station 130, system frame timing, or the like. In addition or alternatively, the information can include, but is not limited to, information regarding the base station 130 or the base station's coverage area. For example, the broadcasted information can provide access credentials, a schedule for other following signals, MNC, MCC, MBC, TAC, RRC, uplink power control, preamble power ramping, uplink cyclic prefix length, sub frame hopping, uplink EARFCN center frequency, cell re-selection information, exclusivity parameters, cell barred timer, access class barred, cell ID, intra-frequency neighbors, basic handover information, or the like. In some cases, the broadcasted information can indicate that the base station 130 is in an exclusivity state or is otherwise unavailable.

At block 804, the base station 130 receives a request for a communication link from a user equipment. In some cases, the communication link can be a preliminary communication link. For example, using the various signals received from the base station, the UE can initiate a preliminary communication link with the base station. The preliminary communication link can be a low-level radio frequency (RF) connection, and can enable the UE to establish bi-directional communication with the base station 130. However, in some cases, the preliminary communication link does not enable the UE to connect to the network associated with the base station and/or does not enable the UE to communicate with other devices that are accessible via the network, such as other UE, servers, etc.

In addition or alternatively, the communication link can be a preliminary communication link. In some cases, a primary communication link can enable the UE to connect to the network associated with the base station and/or communicate with other devices that are accessible via the network, such as other UE, servers, etc. In some cases, the base station can receive both a request for a preliminary communication link and a request for a primary communication link. For example, the base station 130 can receive the requests in parallel or at different times. In some cases, the base station 130 can receive the request for a primary communication link after a preliminary communication link has been established. However, in some cases, the base station 130 can receive the request for a primary communication link before or without a preliminary communication link having been established.

The request can be received using one or more various wireless communication techniques. For example, the request can be received over one or more frequency bands, such as over an RF band. Furthermore, the request can be in the form of data packets.

At block 806, the base station 130 can verify that the UE is permitted to access the base station's network. In some cases, the base station can verify the UE based on a determination that the request was received while the base station is broadcasting its exclusivity parameter (non-limiting examples: cell barred signal or indicator, unavailability signal, do-not-connect signal). In other words, the base station 130 can verify a UE based on a determination that the UE ignored the base station's indication that the base station 130 is in an exclusivity state or is otherwise not available for connection.

In addition or alternatively, the base station can verify the UE based on a determination that the request from the UE includes an identifier corresponding to a UE-base station pair associated with the base station 130 (for example, an access identifier, a UE identifier, a base station identifier, a UE-base station pair identifier or other identifier). For example, the base station 130 can store or be associated with an identifier. In addition or alternatively, each of the one or more UE of a particular UE-base station pair can be pre-configured with an identifier corresponding to the particular UE-base station pair. The base station 130 can verify a UE based on a determination that the UE provided a predetermined identifier or a matching identifier, as compared to the base station's stored or associated identifier. However, it will be understood that fewer, more, or different techniques can be employed to verify that the UE is permitted to access the network.

At block 808, based on a verification that the UE is permitted to access the network, the base station 130 can establish a communication link. The communication link can include a preliminary communication link, which can be a low-level radio frequency (RF) connection. In some cases, the preliminary communication link can enable the UE to establish bi-directional communication with the base station 130, but, in some cases, cannot enable the UE to connect to the network associated with the base station and/or cannot enable the UE to communicate with other devices that are accessible via the network, such as other UE, servers, etc. However, in some cases, a preliminary communication link can enable the UE to connect to the network and/or communicate with other devices that are accessible via the network. In addition or alternatively, the communication link can include a primary communication link that enables the UE to connect to the network associated with the base station 130 and/or to communicate with other devices that are accessible via the network.

It will be understood that at least some of the blocks of routine 800 can be performed in different orders or in parallel. Furthermore, it will be understood that the routine 800 can include fewer or more blocks as desired. For example, the UE 110 can implement some or all of various blocks of other routines described herein (for example, routine 400, 500, 600, or 700) concurrently or change the order as desired. In some embodiments, the base station 130 can broadcast additional signals from which a UE can determine the strength and quality of a base station signal where the UE is located. In certain embodiments, the signals and additional signals can be combined into a single information block or a single set of information blocks. In some cases, rather than establish the communication link with the UE, the base station 130 can allow the UE to establish the communication link.

EXAMPLE EMBODIMENTS

Various example embodiments of the disclosure can be described in view of the following Clauses:

Clause 1. A method for establishing a communication link between a user equipment and a base station of a UE-base station pair, the method comprising:
- scanning one or more frequency bands for broadcast signals;
- receiving at a user equipment (UE), first information blocks from a plurality of base stations;
- determining a strength and quality of a signal from each of the plurality of base stations based on the first information blocks;
- receiving at the UE, second information blocks from the plurality of base stations, wherein the UE stores a cell identifier identifying a particular base station that is part of a UE-base station pair that also includes the UE;
- identifying at least one base station of the one or more base stations that is broadcasting an exclusivity parameter indicating that the at least one base station is not available for connection based on the second information blocks;
- determining that a cell identifier identifying the at least one base station matches the cell identifier identifying the particular base station that is part of the UE-base station pair;
- determining that the strength and quality of the signal from the at least one base station satisfies a signal strength and quality threshold identified by the UE; and/or
- initiating a request to connect to the at least one base station based on (i) identifying the at least one base station is broadcasting the exclusivity parameter, (ii) determining that the cell identifier identifying the at least one base station matches the cell identifier identifying the particular base station that is part of the UE-base station pair, and/or (iii) determining that the strength and quality of the signal from the at least one base station satisfies the signal strength and quality threshold.

Clause 2. A method for establishing a communication link with a base station, the method comprising:
- receiving broadcast signals from one or more base stations;
- identifying at least one base station of the one or more base stations that is broadcasting an exclusivity parameter; and/or
- initiating a request to connect to the at least one base station based on the exclusivity parameter.

Clause 3. The method of clause 2, further comprising identifying a particular base station that is not broadcasting the exclusivity parameter; and determining not to initiate a request to connect to the particular base station based on absence of the exclusivity parameter.

Clause 4. The method of any of clauses 2 or 3, further comprising reviewing the broadcast signals to identify a base station identifier corresponding to the at least one base station, wherein the initiating the request to connect is further based on a determination that the base station identifier corresponding to the at least one base station matches a base station identifier associated with the UE.

Clause 5. The method of any of clauses 2-4, further comprising determining that a base station identifier corresponding to the at least one base station matches a base station identifier corresponding to a UE-base station pair that is associated with the UE.

Clause 6. The method of any of clauses 2-5, further comprising determining that a strength and quality of the broadcast signals from the at least one base station satisfies a signal strength and quality threshold.

Clause 7. The method of any of clauses 2-6, further comprising reviewing the broadcast signals to identify a strength and quality of the broadcast signals corresponding to the at least one base station, wherein the initiating the request to connect is further based on a determination that the strength and quality of the broadcast signals from the at least one base station satisfies a signal strength and quality threshold.

Clause 8. The method of clause 7, wherein the broadcast signals comprise bandwidth information for the one or more base stations at a particular frequency band, wherein the determination that the strength and quality of the broadcast signals from the at least one base station satisfies the signal strength and quality threshold is based at least in part on the bandwidth information.

Clause 9. The method of any of clauses 2-8, wherein the request to connect to the at least one base station comprises a request for a primary communication link, wherein the primary communication link enables the UE to communicate with other devices within a network that is accessible via the base station.

Clause 10. The method of clause 9, wherein the request to connect is a second request to connect, wherein the method further comprises:
- initiating a first request to connect to the at least one base station, wherein the first request comprises a request for a preliminary communication link between the UE and the at least one base station based at least in part on a determination that a strength and quality of the broadcast signals from the at least one base station satisfies a signal strength and quality threshold, wherein the preliminary communication link does not enable the UE to communicate with other devices within a network that is accessible via the base station.

Clause 11. The method of any of clauses 2-10, wherein the initiating the request to connect comprises providing the at least one base station with an access identifier, wherein the at least one base station uses the access identifier to determine whether to permit the UE to connect to the at least one base station.

Clause 12. The method of any of clauses 2-11, wherein each of the one or more base stations transmit the broadcast signals over overlapping frequency bands.

Clause 13. The method of any of clauses 2-12, further comprising determining that the at least one base station of the one or more base stations is in an exclusivity state based at least in part on the broadcast signals.

Clause 14. A method for establishing a communication link with a user equipment (UE), the method comprising:
- broadcasting, from a base station, one or more signals indicating that the base station is operating in an exclusivity state;
- receiving a request to connect to the base station, wherein the request to connect includes an access identifier associated with a UE initiating the request to connect;
- verifying that the UE is permitted to connect to the base station based at least in part on the access identifier; and/or
- establishing a communication link between the base station and the UE.

Clause 15. The method of clause 14, wherein the verifying that the UE is permitted to connect to the base station comprises determining the access identifier matches an access identifier associated with the base station.

Clause 16. The method of any of clauses 14 or 15, wherein the UE is a first UE, the access identifier is a first access identifier, and the request is a first request, wherein the method further comprises:
  receiving a second request to connect to the base station, wherein the second request to connect includes a second access identifier associated with a second UE initiating the second request to connect; and
  determining that the second UE is not permitted to connect to the base station based at least in part on the second access identifier.

Clause 17. The method of clause 16, wherein the determining that the second UE is not permitted to connect to the base station comprises determining the second access identifier does not match an access identifier associated with the base station.

Clause 18. A system for establishing a communication link between a user equipment (UE) and a base station of a UE-base station pair, the system comprising:
  a UE configured to store a cell identifier identifying a particular base station that is part of a UE-base station pair also includes the UE, wherein the UE is further configured to:
    scan one or more frequency bands for broadcast signals;
    receive first information blocks from a plurality of base stations;
    determine a strength and quality of a signal from each of the plurality of base stations based on the first information blocks;
    receive second information blocks from the plurality of base stations;
    identify at least one base station of the one or more base stations that is broadcasting an exclusivity parameter indicating that the at least one base station is not available for connection based on the second information blocks;
    determine that a cell identifier identifying the at least one base station matches the cell identifier identifying the particular base station that is part of the UE-base station pair;
    determine that the strength and quality of the signal from the at least one base station satisfies a signal strength and quality threshold identified by the UE; and/or
    initiate a request to connect to the at least one base station based on (i) the identification that the at least one base station is broadcasting the exclusivity parameter, (ii) the determination that the cell identifier identifying the at least one base station matches the cell identifier identifying the particular base station that is part of the UE-base station pair, and/or (iii) the determination that the strength and quality of the signal from the at least one base station satisfies the signal strength and quality threshold.

Clause 19. A system for establishing a communication link between a user equipment (UE) and a base station of a UE-base station pair, the system comprising:
  a UE configured to:
    receive broadcast signals from one or more base stations;
    identify at least one base station of the one or more base stations that is broadcasting an exclusivity parameter; and/or
    initiate a request to connect to the at least one base station based on the exclusivity parameter.

Clause 20. The system of clause 19, wherein the UE is further configured to:
  identify a particular base station that is not broadcasting the exclusivity parameter; and
  determine not to initiate a request to connect to the particular base station based on absence of the exclusivity parameter.

Clause 21. The system of any of clauses 19 or 20, wherein the UE is further configured to determine that a base station identifier corresponding to the at least one base station matches a base station identifier corresponding to a UE-base station pair that is associated with the UE.

Clause 22. The system of any of clauses 19-21, wherein the UE is further configured to determine that a strength and quality of the broadcast signals from the at least one base station satisfies a signal strength and quality threshold.

Clause 23. The system of any of clauses 19-22, wherein the UE is further configured to review the broadcast signals to identify a base station identifier corresponding to the at least one base station, wherein the initiation of the request to connect is further based on a determination that the base station identifier corresponding to the at least one base station matches a base station identifier associated with the UE.

Clause 24. The system of any of clauses 19-23, wherein the UE is further configured to review the broadcast signals to identify a strength and quality of the broadcast signals corresponding to the at least one base station, wherein the initiation of the request to connect is further based on a determination that the strength and quality of the broadcast signals from the at least one base station satisfies a signal strength and quality threshold.

Clause 25. The system of any of clauses 19-24, wherein the broadcast signals comprise bandwidth information for the one or more base stations at a particular frequency band, wherein the determination that the strength and quality of the broadcast signals from the at least one base station satisfies the signal strength and quality threshold is based at least in part on the bandwidth information.

Clause 26. The system of any of clauses 19-25, wherein the request to connect to the at least one base station comprises a request for a primary communication link, wherein the primary communication link enables the UE to communicate with other devices within a network that is accessible via the base station.

Clause 27. The system of clause 26, wherein the request to connect is a second request to connect, wherein the UE is further configured to:
  initiate a first request to connect to the at least one base station, wherein the first request comprises a request for a preliminary communication link between the UE and the at least one base station based at least in part on a determination that a strength and quality of the broadcast signals from the at least one base station satisfies a signal strength and quality threshold, wherein the preliminary communication link does not enable the UE to communicate with other devices within a network that is accessible via the base station.

Clause 28. The system of any of clauses 19-27, wherein to initiate the request to connect, the UE is further configured to provide the at least one base station with an access identifier, wherein the at least one base station uses the access identifier to determine whether to permit the UE to connect to the at least one base station.

Clause 29. The system of any of clauses 19-28, wherein each of the one or more base stations transmit the broadcast signals over overlapping frequency bands.

Clause 30. The system of any of clauses 19-29, wherein the UE is further configured to determine that the at least one base station of the one or more base stations is in an exclusivity state based at least in part on the broadcast signals.

Clause 31. A system for establishing a communication link between a user equipment (UE) and a base station of a UE-base station pair, the system comprising:
a base station configured to:
broadcast one or more signals indicating that the base station is operating in an exclusivity state;
receive a request to connect to the base station, wherein the request to connect includes an access identifier associated with a UE initiating the request to connect;
verify that the UE is permitted to connect to the base station based at least in part on the access identifier; and/or
establish a communication link between the base station and the UE.

Clause 32. The system of clause 31, wherein to verify that the UE is permitted to connect, the base station is further configured to determine that the access identifier matches an access identifier associated with the base station.

Clause 33. The system of any of clauses 31 or 32, wherein the UE is a first UE, the access identifier is a first access identifier, and the request is a first request, wherein the base station is further configured to:
receive a second request to connect to the base station, wherein the second request to connect includes a second access identifier associated with a second UE initiating the second request to connect; and
determine that the second UE is not permitted to connect to the base station based at least in part on the second access identifier.

Clause 34. The system of any of clauses 31-33, wherein to determine that the second UE is not permitted to connect to the base station, the base station is further configured to determine that the second access identifier does not match an access identifier associated with the base station.

Clause 35. A method for establishing a communication link between a user equipment and a base station of a UE-base station pair, the method comprising one or more of the steps or features of the foregoing description or drawings.

Clause 36. A system for establishing a communication link between a user equipment and a base station of a UE-base station pair, the system comprising one or more of the features of the foregoing description or drawings.

Clause 37. A user equipment comprising one or more of the features of the foregoing description or drawings.

Clause 38. A user equipment configured to perform one or more of the steps of the foregoing description or drawings.

Clause 39. A base station comprising one or more of the features of the foregoing description or drawings.

Clause 40. A base station configured to perform one or more of the steps of the foregoing description or drawings.

TERMINOLOGY

Although generally described above as being related to communication systems, it will be understood that the backhaul access component can be implemented as a stand-alone device and can communicate with an communication system and/or a component of a network to control access to the backhaul. For example, the backhaul access component can be configured to communicate with a base station or a core component of a cellular network, such as, but not limited to, a component of the evolved packet core (EPC) of a long-term evolution (LTE) system, etc., or other type of wireless network. In such embodiments, the backhaul access component can cause the corresponding component to perform some or all of the functions described herein with respect to the communication system.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Virtualization technologies allow a single physical computing device to host one or more instances of a virtual machine, which virtual machine instance appears to a user as an independent computing device. With virtualization, the host computing device can create, maintain, delete, or otherwise manage virtual machines instances in a dynamic manner. In turn, users can request computing resources, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method for establishing a communication link between a user equipment and a base station of a UE-base station pair, the method comprising:
    scanning one or more frequency bands for broadcast signals;
    receiving at a user equipment (UE), first information blocks from a plurality of base stations;
    determining a strength and quality of a signal from each of the plurality of base stations based on the first information blocks;
    receiving at the UE, second information blocks from the plurality of base stations, wherein the UE stores a cell identifier identifying a particular base station that is part of a UE-base station pair that also includes the UE;
    identifying at least one base station of the plurality of base stations that is broadcasting an exclusivity parameter indicating that the at least one base station is not available for connection based on the second information blocks;
    determining that a cell identifier identifying the at least one base station matches the cell identifier identifying the particular base station that is part of the UE-base station pair;
    determining that the strength and quality of the signal from the at least one base station satisfies a signal strength and quality threshold; and
    initiating a request to connect to the at least one base station based on identifying the at least one base station is broadcasting the exclusivity parameter, determining that the cell identifier identifying the at least one base station matches the cell identifier identifying the particular base station that is part of the UE-base station pair, and determining that the strength and quality of the signal from the at least one base station satisfies the signal strength and quality threshold.

2. A method for establishing a communication link with a base station, the method comprising:
    receiving broadcast signals from one or more base stations;
    identifying at least one base station of the one or more base stations that is broadcasting an exclusivity parameter indicating that the at least one base station is not available for connection; and
    initiating a request to connect to the at least one base station based at least in part on the exclusivity parameter, a determination that a base station identifier identifying the at least one base station matches a base station identifier identifying a particular base station that is part of a UE-base station pair, and a determination that a strength and quality of at least one broadcast signal of the broadcast signals from the at least one base station satisfies a signal strength and quality threshold.

3. The method of claim 2, further comprising:
    identifying a first base station of the one or more base stations that is not broadcasting the exclusivity parameter; and
    determining not to initiate a request to connect to the first base station based on absence of the exclusivity parameter.

4. The method of claim 2, further comprising reviewing the broadcast signals to identify the base station identifier corresponding to the at least one base station.

5. The method of claim 2, further comprising reviewing the broadcast signals to identify the strength and quality of the at least one broadcast signal from the at least one base station.

6. The method of claim 5, wherein the broadcast signals comprise bandwidth information for the one or more base stations at a particular frequency band, wherein the determination that the strength and quality of the at least one broadcast signal from the at least one base station satisfies the signal strength and quality threshold is based at least in part on the bandwidth information.

7. The method of claim 2, wherein the request to connect to the at least one base station comprises a request for a primary communication link, wherein the primary communication link enables a UE within a network that is accessible via the at least one base station to communicate with other devices within the network that is accessible via the at least one base station.

8. The method of claim 7, wherein the request to connect is a second request to connect, wherein the method further comprises:
    initiating a first request to connect to the at least one base station, wherein the first request comprises a request for a preliminary communication link between the UE and the at least one base station based at least in part on the determination that the strength and quality of the at least one broadcast signal from the at least one base station satisfies the signal strength and quality threshold, wherein the preliminary communication link does not enable the UE to communicate with the other devices within the network that is accessible via the at least one base station.

9. The method of claim 2, wherein the initiating the request to connect comprises providing the at least one base station with an access identifier, wherein the at least one base station uses the access identifier to determine whether to permit a UE within a network that is accessible via the at least one base station to connect to the at least one base station.

10. The method of claim 2, wherein each of the one or more base stations transmits the broadcast signals over overlapping frequency bands.

11. The method of claim 2, further comprising determining that the at least one base station is in an exclusivity state based at least in part on the broadcast signals.

12. A system for establishing a communication link between a user equipment (UE) and a base station of a UE-base station pair, the system comprising:
    a UE configured to:
        receive broadcast signals from one or more base stations;
        identify at least one base station of the one or more base stations that is broadcasting an exclusivity parameter indicating that the at least one base station is not available for connection; and
        initiate a request to connect to the at least one base station based on the exclusivity parameter, a determination that a base station identifier identifying the at least one base station matches a base station identifier identifying a particular base station that is part of a UE-base station pair that is associated with the UE, and a determination that a strength and quality of at least one broadcast signal from the at least one base station satisfies a signal strength and quality threshold.

13. The system of claim 12, wherein the UE is further configured to:
    identify a first base station of the one or more base stations that is not broadcasting the exclusivity parameter; and
    determine not to initiate a request to connect to the first base station based on absence of the exclusivity parameter.

14. The system of claim 12, wherein the request to connect to the at least one base station is a second request, wherein the second request is for a primary communication link that enables the UE to communicate with other devices within a network that is accessible via the at least one base station, wherein the UE is further configured to:
    initiate a first request to connect to the at least one base station prior to the second request, wherein the first request comprises a request for a preliminary communication link between the UE and the at least one base station based at least in part on the determination that the strength and quality of the at least one broadcast signal from the at least one base station satisfies the signal strength and quality threshold, wherein the preliminary communication link does not enable the UE to communicate with the other devices within the network that is accessible via the at least one base station.

15. The system of claim 12, wherein to initiate the request to connect, the UE is further configured to provide the at least one base station with an access identifier, wherein the at least one base station uses the access identifier to determine whether to permit the UE to connect to the at least one base station.

16. The system of claim 12, wherein each of the one or more base stations transmits the broadcast signals over overlapping frequency bands.

* * * * *